United States Patent
Tribulowski et al.

(10) Patent No.: US 9,322,343 B2
(45) Date of Patent: Apr. 26, 2016

(54) METHOD FOR AUTOMATICALLY SWITCHING OFF AND STARTING AN INTERNAL COMBUSTION ENGINE OF A MOTOR VEHICLE WITH AN AUTOMATIC TRANSMISSION, DURING OR AFTER AN OVERRUN PHASE

(71) Applicant: Bayersiche Motoren Werke Aktiengesellschaft, Munich (DE)

(72) Inventors: Jan Tribulowski, Wolnzach (DE); Benedikt Klaus, Windach (DE); Andreas Erwied, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 138 days.

(21) Appl. No.: 14/298,055

(22) Filed: Jun. 6, 2014

(65) Prior Publication Data

US 2014/0288807 A1 Sep. 25, 2014

Related U.S. Application Data

(63) Continuation of application No. PCT/EP2012/073949, filed on Nov. 29, 2012.

(30) Foreign Application Priority Data

Dec. 7, 2011 (DE) .......................... 10 2011 087 891

(51) Int. Cl.
*F02D 29/02* (2006.01)
*F02N 11/08* (2006.01)
(Continued)

(52) U.S. Cl.
CPC ................ *F02D 29/02* (2013.01); *F02D 13/06* (2013.01); *F02N 11/0818* (2013.01);
(Continued)

(58) Field of Classification Search
CPC ............ F02N 11/0818; F02N 11/0844; F02N 2200/0802; F16H 61/143; F16H 2312/14; F02D 13/06; F02D 29/02; F02D 41/123; Y02T 10/48; Y02T 10/18; F01L 2013/0068

USPC .......... 701/101, 102, 110, 112; 123/320, 323, 123/325; 477/77, 78
See application file for complete search history.

(56) References Cited

U.S. PATENT DOCUMENTS 5,807,209 A * 9/1998 Matsubara ............ B60W 10/06
477/169
8,177,686 B2 * 5/2012 Ries ...................... F16H 61/143
477/168

(Continued)

FOREIGN PATENT DOCUMENTS

DE 24 41 827 C2 3/1976
DE 100 23 331 A1 6/2001
(Continued)

OTHER PUBLICATIONS

German Search Report dated Apr. 26, 2012 with Statement of Relevancy page (Six (6) pages).

(Continued)

*Primary Examiner* — Hieu T Vo
*Assistant Examiner* — Arnold Castro
(74) *Attorney, Agent, or Firm* — Crowell & Moring LLP

(57) ABSTRACT

An internal combustion engine in a motor vehicle is automatically shut off and started by way of a start-stop device, wherein an automatic shut-off process is initiated during a coasting operation phase of the internal combustion engine, and an automatic start process is initiated when at least one activation command occurs. For shutting off the internal combustion engine in the coasting operation phase, a gas exchange in cylinders of the internal combustion engine is at least almost completely suppressed and, at the same time, a torque converter lock-up clutch disposed between the internal combustion engine and the transmission for power transmission purposes is actuated such that the torque converter lock-up clutch remains or is at least almost completely engaged.

18 Claims, 3 Drawing Sheets

(51) Int. Cl.
*F16H 61/14* (2006.01)
*F02D 13/06* (2006.01)
*F02D 41/12* (2006.01)
*F01L 13/00* (2006.01)

(52) U.S. Cl.
CPC ......... *F02N 11/0844* (2013.01); *F16H 61/143* (2013.01); *F01L 2013/0068* (2013.01); *F02D 41/123* (2013.01); *F02N 2200/0802* (2013.01); *F16H 2312/14* (2013.01); *Y02T 10/18* (2013.01); *Y02T 10/48* (2013.01)

(56) References Cited

U.S. PATENT DOCUMENTS

| | | | | |
|---|---|---|---|---|
| 8,192,327 | B2* | 6/2012 | Gibson | B60W 10/02 477/77 |
| 8,630,778 | B2* | 1/2014 | Hopp | B60W 10/026 476/1 |
| 2004/0058779 | A1* | 3/2004 | Ayabe | B60W 10/115 477/121 |
| 2008/0026905 | A1* | 1/2008 | Dickinson | B60W 10/026 477/62 |
| 2011/0053735 | A1* | 3/2011 | Lewis | F02N 11/0822 477/99 |
| 2011/0054765 | A1* | 3/2011 | Lewis | F02D 41/062 701/112 |
| 2011/0077830 | A1* | 3/2011 | Lochocki, Jr. | B60W 10/02 701/68 |
| 2011/0146609 | A1 | 6/2011 | Enoki | |
| 2012/0065022 | A1* | 3/2012 | Ohashi | B60W 10/023 477/77 |
| 2012/0208674 | A1* | 8/2012 | Doering | F02D 41/0215 477/107 |
| 2015/0032349 | A1* | 1/2015 | Sato | F16H 1/143 701/68 |

FOREIGN PATENT DOCUMENTS

| | | |
|---|---|---|
| DE | 10 2010 034 554 A1 | 3/2011 |
| EP | 1 227 230 A2 | 7/2002 |
| EP | 1 344 901 A2 | 9/2003 |
| EP | 1 426 593 A2 | 6/2004 |
| JP | H02-200538 A | 8/1990 |

OTHER PUBLICATIONS

International Search Report dated Apr. 11, 2013 (Three (3) pages).

\* cited by examiner

METHOD FOR AUTOMATICALLY SWITCHING OFF AND STARTING AN INTERNAL COMBUSTION ENGINE OF A MOTOR VEHICLE WITH AN AUTOMATIC TRANSMISSION, DURING OR AFTER AN OVERRUN PHASE

CROSS REFERENCE TO RELATED APPLICATIONS

This application is a continuation of PCT International Application No. PCT/EP2012/073949, filed Nov. 29, 2012, which claims priority under 35 U.S.C. §119 from German Patent Application No. 10 2011 087 891.2, filed Dec. 7, 2011, the entire disclosures of which are herein expressly incorporated by reference.

BACKGROUND AND SUMMARY OF THE INVENTION

The invention relates to a method and to an accordingly-designed device for automatically shutting off and starting an internal combustion engine in a motor vehicle comprising an automated transmission or an automatic transmission according to the preamble of claim 1.

At present, the internal combustion engine is shut off manually by the driver by way of an ignition key in the majority of vehicles available on the market. One exception is a method that is described in DE 100 23 331 A1. Instead of the ignition key, here the brake pedal position or the brake pedal pressure is evaluated. The shut-off process of the internal combustion engine is initiated if the brake pedal is actuated more strongly in the previously actuated position thereof after the motor vehicle has come to a stop. The disadvantage of such methods is that the motor vehicle driver alone is responsible for shutting off the internal combustion engine. Analyses of today's driving behavior show that the internal combustion engine is rarely shut off separately, such as at traffic lights, despite increased environmental awareness and higher fuel prices.

So as to lower fuel consumption and emissions of harmful substances, methods and systems are presently under development, and some of them are already being employed, which automatically shut off the internal combustion engine of a motor vehicle with certain prerequisites or when predefined shut-off conditions exist, and automatically turn the internal combustion engine back on when predefined turn-on conditions exist. Such methods and systems or start-stop devices are suitable in particular for city traffic to reduce fuel consumption since in city traffic the vehicle comes to a halt frequently at traffic lights or due to traffic, and the operation of the internal combustion engine is not necessary during such times.

At present, vehicles comprising automatic transmissions and an automatic start-stop function are already available, in which the engine is automatically shut off from the idle state if the brake pedal remains depressed while the vehicle is stationary and the seat belt is fastened or the driver's door is closed. The automatic start of the internal combustion engine is initiated again as soon as the brake pedal is released. Proceeding from a prior coasting operation of the motor vehicle during which no combustion takes place, prior to shutting down the internal combustion engine, firing of the cylinders is restarted for comfort reasons and to safely reach the idle speed when a re-establishment speed limit has been reached which is greater than the idle speed. This firing (renewed injection and ignition) prior to switching off the internal combustion engine has a modestly negative effect on the fuel consumption and $CO_2$ emission. At the same time, the torque converter lock-up clutch provided between the internal combustion engine and the transmission for power transmission purposes is disengaged no later than when the idle speed is reached so as to prevent stalling of the internal combustion engine.

So as to be able to save even more fuel and further reduce $CO_2$ emissions, systems are already known in which the internal combustion engine is already shut off at higher velocities. For example, DE 24 41 827 C2 discloses a device for switching off and starting an internal combustion engine that already shuts off automatically in coasting operation, which is to say, before the vehicle has come to a stop. A renewed start is only allowed if the rotational speed is considerably lower than the idle speed. The disadvantage here is primarily that the start process cannot be initiated for a very long time.

So as to enable a renewed start at higher rotational speeds or while the vehicle is still moving, a so-called reflex-capable start system is required, since starting by way of a conventional pinion starter is only possible when the engine is stopped. So as to enable an earlier start, a reflex-capable system designed as a starter generator can be used, for example.

Moreover, to shut down the internal combustion engine at higher vehicle speeds, a second battery, which is decoupled from the starter battery, and a suitable decoupling and charging unit (such as DC/DC converter) must be provided, which maintains the vehicle electrical system voltage during a renewed engine start (in particular while the vehicle is still moving) so that safety-relevant operating systems (such as DSC) remain active. The use of a second battery and of a starter generator results in considerable costs that must be borne by the manufacturer or by the buyer.

It is now the object of the invention to provide a method and a corresponding device for automatically shutting off and starting an internal combustion engine, in which shutting off of the internal combustion engine and renewed starting are made possible in a cost-effective manner prior to coming to a stop, including before the engine has come to a complete halt.

This object is achieved by the invention recited in the independent claims. Advantageous refinements will be apparent from the dependent claims.

In principle, the invention is based on a previously-known method for automatically shutting off and starting an internal combustion engine in a motor vehicle comprising an automatic transmission or automated transmission by way of a start-stop device, which initiates an automatic shut-off process of the internal combustion engine during a coasting operation phase of the internal combustion engine, and which initiates an automatic start process of the internal combustion engine when at least one activation command is present and optionally when further activation conditions are met.

The basic idea of the invention is to crank the internal combustion engine during the shut-off process down to very low rotational speed thresholds, and ideally to below a predefined 'DSC active' threshold. According to the invention, as a first measure for shutting off the internal combustion engine during a coasting operation phase of the internal combustion engine (during the coasting operation phase, no combustion takes place, which is to say no fuel is injected and no ignition occurs) to at least almost completely suppress a gas exchange in the cylinders of the internal combustion engine during the coasting operation phase using suitable measures. As a second measure, at the same time a torque converter lock-up clutch disposed between the internal combustion engine and the transmission for power transmission purposes is actuated during the shut-off process in such a way that this torque converter lock-up clutch at least almost completely remains engaged, or is engaged. A re-establishment of the combustion process when the so-called re-establishment speed is reached—as is required in the related art—is not necessary, which is to say that the combustion process is suspended until an activation command, and the start process initiated therewith occurs.

This results in consumption advantages not only due to the early shut-off of the internal combustion engine, but also due to the absence of combustion in the interim.

The gas exchange in the cylinders of the internal combustion engine is advantageously suppressed by closing the exhaust valves and/or closing the intake valves of the cylinders of the internal combustion engine. For example, a previously known VVT system (variable valve timing system) having zero-lift capability or switching finger follower may be technology that is used to close at least the exhaust valves. By suppressing the gas exchange in the cylinders, the drag torque is considerably reduced, so that the energy of the vehicle can be converted significantly better into kinetic energy. Moreover, the gas exchange losses are eliminated, as is the gas exchange noise associated with the gas exchange and vibrations that occur in the drive train due to the compression of the cylinder charge.

If in one advantageous embodiment of the invention the gas exchange in the cylinders is carried out or achieved by closing the exhaust valves, the intake valves can advantageously be actuated in such a way that a predefined quantity of fresh air flows into the cylinders and preferably no residual gas remains in the cylinder.

The gas exchange is advantageously suppressed at least almost completely, and the combustion that was suspended due to the coasting operation is maintained, until the internal combustion engine has come to a complete halt (rotational speed=0) and/or until a start process is initiated.

As was already mentioned above, as a second measure during the shut-off process, at the same time a torque converter lock-up clutch disposed between the internal combustion engine and the transmission for power transmission purposes is actuated in such a way that this torque converter lock-up clutch remains or is at least almost completely engaged so as to prevent the gas exchange in the cylinders. The torque converter lock-up clutch is advantageously actuated in such a way that the torque converter lock-up clutch remains at least almost completely engaged until a predefined rotational speed threshold has been reached, or a drop below the same has occurred, wherein the predefined rotational speed threshold is considerably lower than an idle speed threshold. Ideally, the torque converter lock-up clutch is kept engaged down to as low as possible a rotational speed threshold (such as of 300 to 400 rpm). Contrary to existing methods for automatically shutting off the internal combustion engine, the torque converter lock-up clutch is thus engaged or operated with minimal slippage to as low as possible a rotational speed, which is to say that the internal combustion engine remains rigidly coupled to the transmission down to a very low vehicle speed. If minimal slippage of the torque converter lock-up clutch is set, the vibrations of the drive train could also be eliminated at very low rotational speeds.

As a result of the long-lasting frictional connection between the internal combustion engine and the transmission, the internal combustion engine can be restarted during this time at any time on command without delay, and a starter is not required. If the engine is shut down at the lowest possible rotational speeds (approximately 300 rpm), the shut-down period during which no assisted start by way of conventional start systems is possible is considerably reduced.

The initiation of the automatic shut-off process in coasting operation can advantageously be coupled to other conditions. For example, the instantaneous vehicle speed and/or a brake pedal actuation can be evaluated. Ideally, the automatic shut-off process of the internal combustion engine is initiated during the coasting operation phase only if the vehicle speed is lower than a predefined vehicle threshold speed, however which is considerably greater than zero (such as 25 km/h), and/or if the brake pedal is simultaneously actuated during the coasting operation phase.

So as to be able to carry out the method according to the invention, the start-stop device advantageously comprises a control unit for initiating an automatic shut-off process and start process of an internal combustion engine in a motor vehicle comprising an automatic transmission or automated transmission, a first detection device for detecting a coasting operation phase of the motor vehicle, a gas exchange interruption unit for shutting off the gas exchange of the cylinders of the internal combustion engine, and an actuator for actuating a torque converter lock-up clutch disposed between the internal combustion engine and the transmission for power transmission purposes. According to the invention, the control unit is configured in such a way that the same, upon detection of a coasting operation phase of the internal combustion engine, actuates the gas exchange interruption unit in such a way that a gas exchange in the cylinders of the internal combustion engine is at least almost completely suppressed. At the same time, the actuator for actuating the torque converter lock-up clutch is actuated in such a way that the torque converter lock-up clutch remains or is at least almost completely engaged.

The gas exchange interruption unit is advantageously configured in such a way that the same at least almost completely closes the exhaust valves and/or the intake valves of the cylinders of the internal combustion engine so as to suppress the gas exchange. Ideally, a VVT system ((fully) variable valve timing system) having zero-lift capability or switching finger follower may be used for this purpose. Since the ability to actuate the torque converter lock-up clutch must also be ensured at low transmission speeds, the actuator for actuating the torque converter lock-up clutch that is disposed between the internal combustion engine and the transmission for power transmission purposes is advantageously an electrical or switchable hydraulic transmission fluid pump or a hydraulic pressure accumulator.

The method according to the invention will be described again in more detail based on the following exemplary embodiment. In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
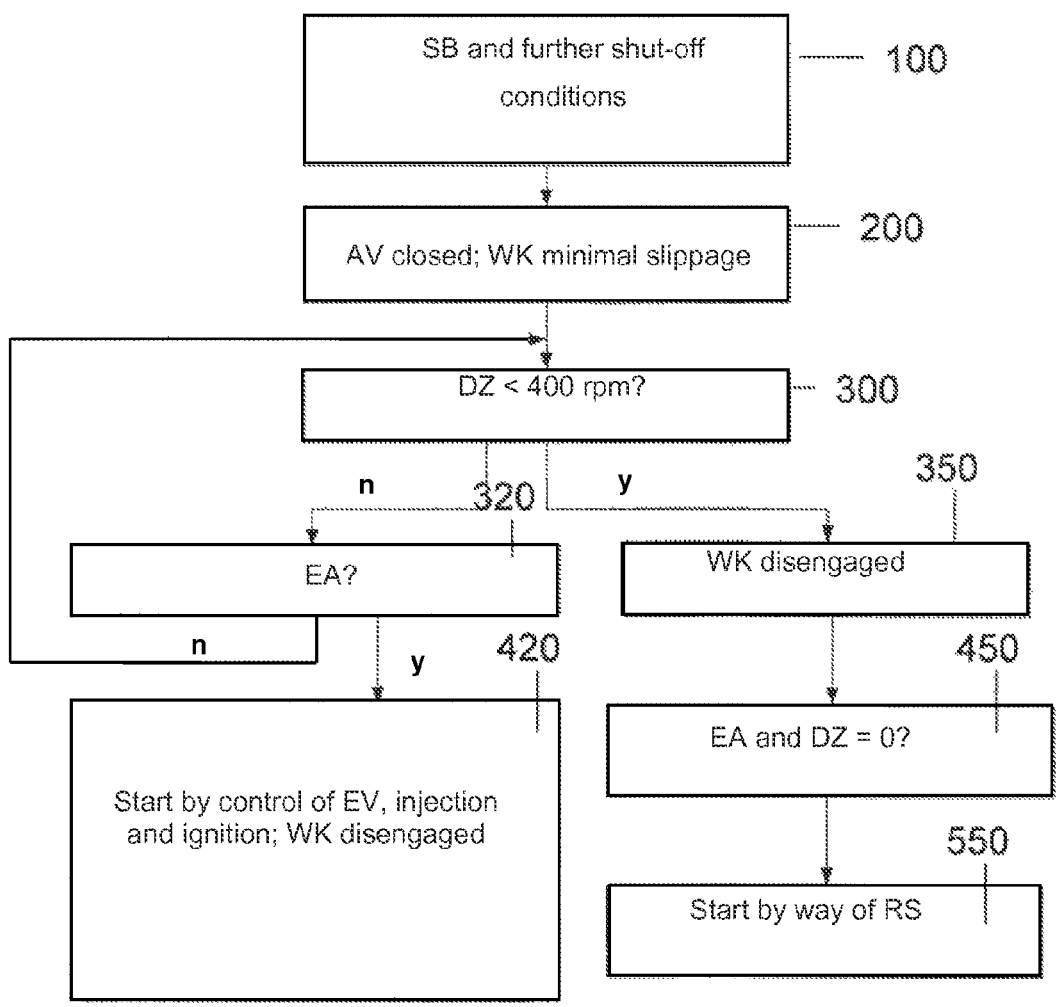
FIG. 1 shows a flow chart to illustrate a particularly advantageous embodiment of the method according to the invention.

FIG. 1 shows a procedure for automatically shutting off and automatically starting an internal combustion engine in a motor vehicle comprising an automatic transmission. In a first step 100, the operation of the internal combustion engine is monitored with respect to the presence of a coasting operation SB. If a coasting operation SB is detected and all other shut-off conditions (such as engine temperature within a predefined temperature window, driver present) are met, in the next step 200, so as to suppress a gas exchange, the exhaust valve AV is closed by an appropriate actuation of a variable valve train and, at the same time, the torque converter lock-up clutch WK is actuated in such a way that the frictional connection between the internal combustion engine is maintained, however that predefined minimal slippage develops. The combustion process, which is interrupted anyhow due to the coasting operation SB, is not initiated again.

Thereafter, in a next step 300, the rotational speed DZ of the internal combustion engine is compared to a predefined rotational speed limit value of 400 rpm. As long as the rotational speed DZ has not dropped below this predefined threshold, a continuous check is carried out in step 320 as to whether an activation command EA to restart the internal combustion engine occurs. If an activation command EA is detected (before a drop below the rotational speed limit value occurs), in a next step 420 another start of the internal combustion engine is initiated by actuating the intake valve EV, while the exhaust valve AV is closed, in such a way that a predefined fresh gas content, which is required for restarting the internal combustion engine, is created in the cylinder. Input variables for controlling the fresh gas charge include the engine temperature, the air temperature in the manifold, the engine speed, the speed gradient and the necessary torque reserve for the restart. The internal combustion engine is started by a (subsequent) injection of the fuel and ignition. Injection is possible until just prior to the ignition top dead center. This results in excellent response times. At the same time, the torque converter lock-up clutch WK is optionally disengaged in a deliberate manner so as to prevent bucking. As soon as the internal combustion engine has reached the target speed, the vehicle transitions to conventional operation.

However, if the rotational speed DZ of the internal combustion engine drops below a predefined rotational speed limit (such as of 400 rpm) (step 300), in a next step 350 the torque converter lock-up clutch WK is disengaged in a deliberate manner and the engine is shut down. The shut-down time until the engine has come to a halt is now very short. If in step 450 an activation command EA for starting the internal combustion engine takes place, the engine start can be carried out in compliance with the command using a conventional pinion starter RS (step 550). A complex reflex-capable system, comprising an optionally required vehicle electrical system enhancement to prevent an impermissible drop of the vehicle electrical system voltage impacting other electrical consumers, is not necessary.

Figure 2:
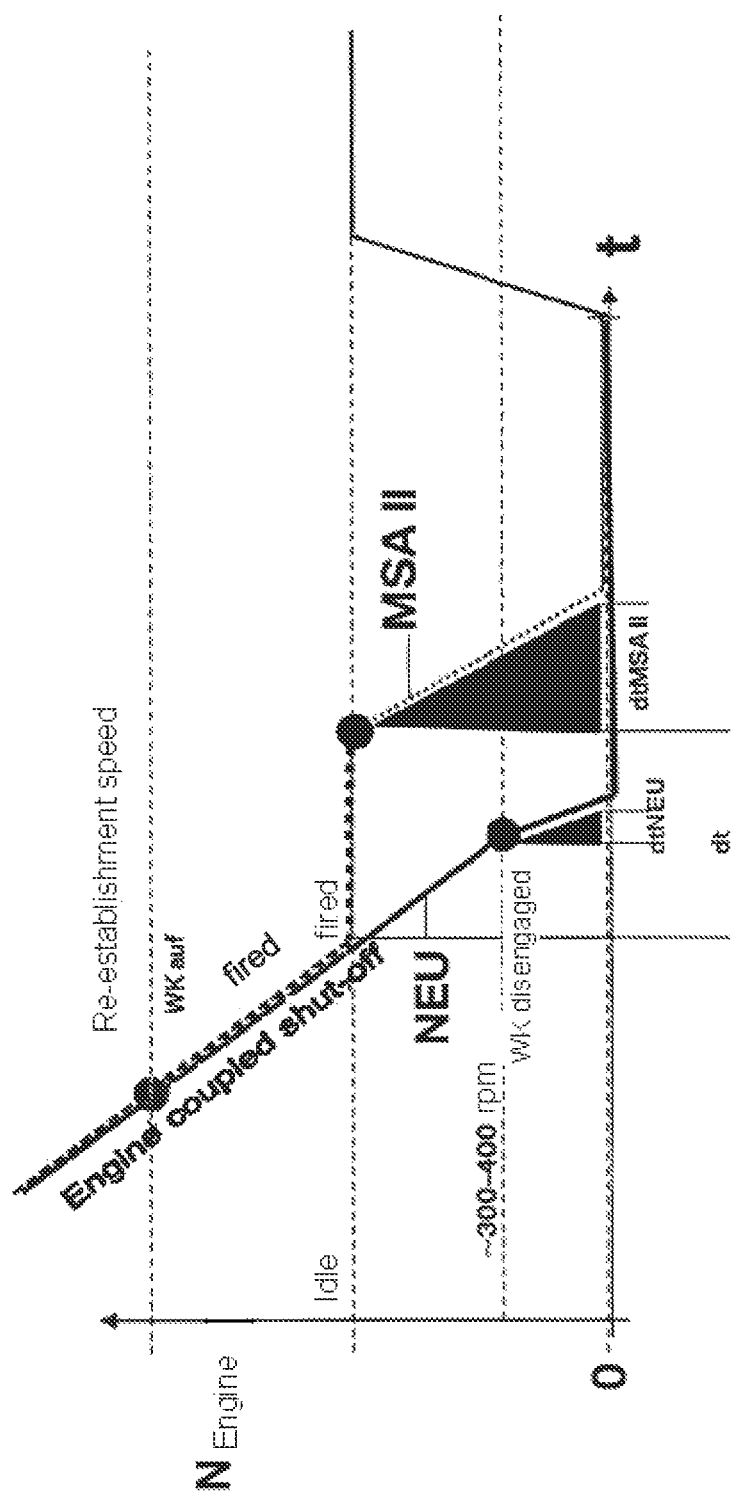
FIG. 2 is an illustration of the rotational speed curve when the method according to the invention is used to shut off the internal combustion engine as compared to a first previously known method.

FIG. 2 shows a comparison between a previously known method and the invention based on a rotational speed curve during an automatic shut-off of the internal combustion engine. This results in the dotted rotational speed curve MSA II based on a method that is already known from the prior art and the solid rotational speed curve NEU based on the new method.

To begin with, the prior art will be addressed again based on the dotted rotational speed curve MSA II. It is assumed here that the vehicle is decelerated by way of brake pedal actuation until it comes to a stop. As long as the rotational speed of the internal combustion engine is greater than the re-establishment speed, no firing takes place (coasting fuel cutoff), which is to say no fuel is consumed. However, as soon as the re-establishment speed is reached, the combustion process must be restarted to achieve safe idle and for comfort reasons—see also "fired" section. The torque converter lock-up clutch WK is disengaged during the transition to idle. The combustion process must be maintained until the internal combustion engine is in fact shut down. So as to give the driver the option of preventing a shut-off of the internal combustion engine, the same is not switched off immediately after reaching idle or a stationary position (or minimal speed), but only after a predefined time interval dt has expired, within which the driver can prevent the internal combustion engine from shutting off. Advanced systems already dispense with this time interval in a stationary position. If a cost-effective pinion starter is used as the start system, a renewed start is not possible while the engine is being shut down, which is to say within the time window dtMSAII.

Contrary to the rotational speed curve MSA II, the illustration of the rotational speed curve NEU according to the invention shows that the rotational speed decreases continuously, starting with the presence of the coasting operation, during which the gas exchange in the cylinder is suppressed, so as to initiate the shut-off process, and at the same time the torque converter lock-up clutch WK remains engaged until a minimal rotational speed limit of 300 to 400 rpm is reached. During this time, renewed starting of the internal combustion engine is possible without difficulty by way of injection and ignition. Only when the minimal rotational speed limit of 300 to 400 rpm is reached is the torque converter lock-up clutch WK disengaged and the engine shut down. The internal combustion engine now reaches the idle position relatively quickly, from which restarting by way of a conventional starter system is possible, which is to say the time window dtNEU within which no start by way of the pinion starter is possible is considerably shorter than with the known system MSA II.

Figure 3:
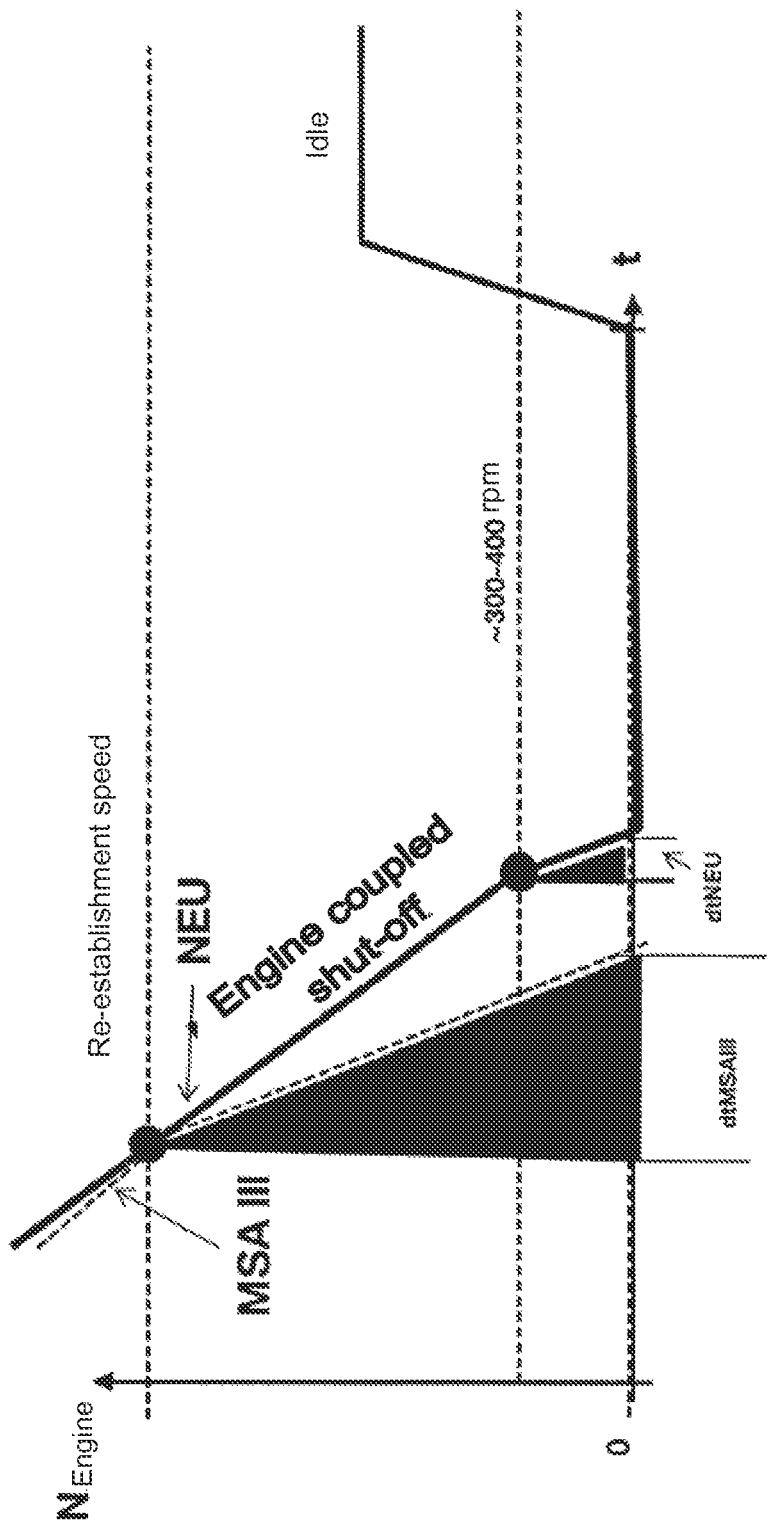
FIG. 3 is an illustration of the rotational speed curve when the method according to the invention is used to shut off the internal combustion engine as compared to a second previously known method.

Contrary to FIG. 2, FIG. 3 shows a developing rotational speed curve MSA III of an alternative previously known method. Here, the internal combustion engine is shut off immediately upon a drop below a predefined limit speed, such as of 25 km/h (above the restart speed), in coasting operation. Because the engine is shut down very early, the time dtMSAIII within which the engine can be started only with a cost-intensive, reflex-capable assisted start system, is very long. Moreover, an additional battery, which maintains the operation of the vehicle systems, is required as a result of shutting off the internal combustion engine at relatively high velocities.

The method according to the invention and the corresponding device result in a number of advantages, which will be summarized again here. For example, by preventing the restart of the combustion process when a so-called re-establishment speed is reached, fuel savings of approximately 2% are achieved over known methods, in which the combustion process must be started again in the idle range prior to shutting off. Since the internal combustion engine remains coupled down to very low rotational speeds, so-called change of mind cases (the driver wants to restart during the deceleration phase of the internal combustion engine) during which starting by way of a conventional start system is not possible are reduced. Since starting is possible without a starter by way of injection and ignition before this minimal rotational speed threshold is reached, a second separate battery and an expensive reflex start-capable assisted start system can be dispensed with. Moreover, the number of engine starts by way of the starter is reduced. This results in less wear and tear, and consequently in a longer service life of the starter.

At present, systems are being tested which shut down the engine above the re-establishment speed. These require a complex reflex start system for the change of mind case so as to be able to intercept the engine at high engine speeds during deceleration. Moreover, complex vehicle electrical system enhancement is required to ensure the stability of the vehicle electrical system during the assisted engine start via an electric machine (starter) while driving (such as a second battery and DC/DC converter). The same advantages apply as in the comparison to the known method described in FIG. 2.

Another advantage results from the closing of the valves, which lowers the fresh gas throughput in coasting operation. Cooling of the catalytic converter is thus prevented, which in turn positively affects emissions.

Finally, it shall be mentioned that the suppression of the gas exchange can also be used for other functions. The resulting reduced drag torque would also allow a gliding function at high velocities, for example. Decoupling of the engine is then also not necessary. The identical procedure can also be used for hybrid vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically shutting off and starting an internal combustion engine in a motor vehicle comprising an automatic transmission or automated transmission by way of a start-stop device, wherein the method comprises:
    initiating, during a coasting operation phase of the internal combustion engine, an automatic shut-off process of the internal combustion engine; and
    initiating an automatic start process of the internal combustion engine when at least one activation command occurs, and wherein, for the automatic shut-off process of the internal combustion engine during the coasting operation phase, a gas exchange in cylinders of the internal combustion engine is at least almost completely suppressed and, at the same time, a torque converter lock-up clutch, disposed between the internal combustion engine and a transmission for power transmission purposes, is actuated so that the torque converter lock-up clutch remains or is closed at least almost completely.

2. The method according to claim 1, wherein the gas exchange in said cylinders of the internal combustion engine is suppressed by closing exhaust valves and/or closing intake valves of said cylinders of the internal combustion engine.

3. The method according to claim 2, wherein, during said suppression of the gas exchange in said cylinders by closing the exhaust valves, the intake valves are actuated such that a predefined quantity of fresh air flows into the cylinders and no residual gas remains in the cylinders.

4. A method according to claim 1, wherein the gas exchange that is at least almost completely suppressed and the combustion that was suspended due to the coasting operation are both maintained until the internal combustion engine is completely shut down with disengagement of the torque converter lock-up clutch and/or until a start process is initiated.

5. A method according to claim 2, wherein the gas exchange that is at least almost completely suppressed and the combustion that was suspended due to the coasting operation are both maintained until the internal combustion engine is completely shut down with disengagement of the torque converter lock-up clutch and/or until a start process is initiated.

6. A method according to claim 3, wherein the gas exchange that is at least almost completely suppressed and the combustion that was suspended due to the coasting operation are both maintained until the internal combustion engine is completely shut down with disengagement of the torque converter lock-up clutch and/or until a start process is initiated.

7. A method according to claim 1, wherein the torque converter lock-up clutch remains at least almost completely engaged until a predefined rotational speed threshold is reached or a drop below the predefined rotational speed occurs, wherein the predefined rotational speed threshold is lower than an idle speed threshold.

8. A method according to claim 2, wherein the torque converter lock-up clutch remains at least almost completely engaged until a predefined rotational speed threshold is reached or a drop below the predefined rotational speed occurs, wherein the predefined rotational speed threshold is lower than an idle speed threshold.

9. A method according to claim 3, wherein the torque converter lock-up clutch remains at least almost completely engaged until a predefined rotational speed threshold is reached or a drop below the predefined rotational speed occurs, wherein the predefined rotational speed threshold is lower than an idle speed threshold.

10. A method according to claim 4, wherein the torque converter lock-up clutch remains at least almost completely engaged until a predefined rotational speed threshold is reached or a drop below the predefined rotational speed occurs, wherein the predefined rotational speed threshold is lower than an idle speed threshold.

11. A method according to claim 7, wherein the predefined rotational speed threshold is between 300 and 400 rpm.

12. A method according to claim 8, wherein the predefined rotational speed threshold is between 300 and 400 rpm.

13. A method according to claim 9, wherein the predefined rotational speed threshold is between 300 and 400 rpm.

14. A method according to claim 10, wherein the predefined rotational speed threshold is between 300 and 400 rpm.

15. A start-stop device comprising:
    a control unit configured to initiate an automatic shut-off process and start process of an internal combustion engine in a motor vehicle comprising an automatic transmission or automated transmission;
    a first detection device configured to detect a coasting operation phase of the motor vehicle;
    a gas exchange interruption unit configured to interrupt a gas exchange in cylinders of the internal combustion engine; and
    an actuator configured to actuate a torque converter lock-up clutch disposed between the internal combustion engine and the transmission for power transmission purposes, wherein, upon the first detection device detecting the coasting operation phase of the internal combustion engine, the control unit is configured to actuate the gas exchange interruption unit such that the gas exchange in said cylinders of the internal combustion engine is at least almost completely suppressed, and wherein the actuator is further configured to actuate the torque converter lock-up clutch such that the torque converter lock-up clutch remains or is at least almost completely engaged.

16. The start-stop device according to claim 15, wherein the gas exchange interruption unit is configured to at least almost completely close exhaust valves and/or intake valves of the cylinders of the internal combustion engine so as to suppress the gas exchange.

17. The start-stop device according to claim 15, further comprising means for ensuring the closing and controlling of the torque converter lock-up clutch at low transmission speeds.

18. The start-stop device according to claim 16, further comprising means for ensuring the closing and controlling of the torque converter lock-up clutch at low transmission speeds.

* * * * *